United States Patent [19]

George

[11] Patent Number: 5,698,602
[45] Date of Patent: Dec. 16, 1997

[54] COMBINATION BUILDING MATERIAL

[76] Inventor: Stanley C. George, 9285 S.W. Inez St., Tigard, Oreg. 97224

[21] Appl. No.: 398,976

[22] Filed: Mar. 6, 1995

[51] Int. Cl.$^6$ .................... C08J 9/24; C08J 9/35
[52] U.S. Cl. ................ 521/54; 521/55; 521/84.1
[58] Field of Search ................ 521/54, 55, 84.1

[56] References Cited

U.S. PATENT DOCUMENTS

| | | | |
|---|---|---|---|
| 3,256,218 | 6/1966 | Knox | 521/54 |
| 3,257,338 | 6/1966 | Sefton | 521/84.1 |
| 3,457,205 | 7/1969 | Nouweiler | 521/84.1 |
| 4,331,726 | 5/1982 | Cleary | 521/54 |
| 4,340,510 | 7/1982 | Howaniety | 521/54 |
| 4,480,053 | 10/1984 | Sherno | 521/54 |
| 5,043,379 | 8/1991 | Ota et al. | 524/507 |
| 5,403,623 | 4/1995 | Kösters et al. | 427/407 |

FOREIGN PATENT DOCUMENTS

| | | |
|---|---|---|
| 1335220 | 8/1989 | Canada . |
| 343 101 | 11/1989 | European Pat. Off. . |
| 346 173 | 12/1989 | European Pat. Off. . |
| 28 40 996 | 3/1979 | Germany . |
| 34 44 863 | 7/1986 | Germany . |
| 35 14 753 | 10/1986 | Germany . |
| 38 30 345 | 11/1989 | Germany . |
| 40 13 318 | 10/1991 | Germany . |
| 43 01 007 | 7/1994 | Germany . |
| 62 141 047 | 6/1987 | Japan . |
| 01 289 854 | 11/1989 | Japan . |
| 5 065 450 | 3/1993 | Japan . |

OTHER PUBLICATIONS

T.G.Fox, Bull Am. Phys. Soc., 1, 1956, p. 122.
Plasticizer Technology, vol. 1, pp. 228–232.

*Primary Examiner*—Morton Foelak
*Attorney, Agent, or Firm*—Robert L. Harrington

[57] ABSTRACT

A material that is a mixture of polystyrene beads, type III cement, an acrylic latex bond and water. The mixed material is placed in a mold and compressed prior to curing to increase the density, to provide a uniform surface finish and to increase the strength of the end product. The insulating value of the end product is substantially the same as a product formed without compressing the material.

6 Claims, 1 Drawing Sheet

COMBINATION BUILDING MATERIAL

FIELD OF THE INVENTION

This invention relates to a building material having the combined properties of strength such as to provide a structural wall and having an insulating property such as to insulate a building interior.

BACKGROUND OF THE INVENTION

Numerous attempts have been made to produce a preformed free standing wall sufficiently strong to support, e.g., a roof, and also sufficiently insulative to satisfy home building codes. An example of such an attempt is illustrated in U.S. Pat. No. 4,725,632. The material is a light weight concrete produced by foaming the concrete in the mixture. Concrete is strong but is highly conductive of heat. It is also heavy. The foam concrete is lighter and is less conductive due to the air pockets provided during foaming. However, it has been found to be still unsatisfactory as an insulator and the foaming sacrifices strength. In any event, it still remains a very heavy product for construction purposes.

A product or material that is known to be non-conductive is polystyrene. A polystyrene chemical mixture is placed in molds and chemically activated to produce a light weight material that is a good insulator. However, it must be provided in a thickness of, e.g., six inches, to produce an R factor of R-21. Even a six inch thick polystyrene wall has limited strength and readily scars and ruptures. It is considered a good insulating material but inadequate as a free standing wall material.

BRIEF SUMMARY OF THE INVENTION

The preferred embodiment of the present invention utilizes polystyrene beads. (Polystyrene beads are used, e.g., to fill the voids of concrete block walls to enhance the non-conductivity of a concrete block wall.) The beads are mixed with a compatible adhesive and cement (the cement functioning primarily as a fire retardant but also adding adhesive properties). A slurry of polystyrene beads, adhesive and cement is poured into a mold and compressed. The beads are literally pressed together and in the compressed format the adhesive and cement bond the beads together to form a rigid wall structure. A volume of beads which would typically produce a six inch thick wall is compressed, e.g., into a four inch wall thickness. Surprisingly, the R factor is unchanged, i.e., the compressed four inch wall remains at R-21 (the R factor for a non-compressed six inch thick polystyrene wall). The compressed and bonded polystyrene bead produces a smooth outer surface (on both sides) that does not readily scar or rupture and is believed far stronger in load carrying capacity than the non-compressed six inch wall produced from molded polystyrene chemicals. The outer surface is hardened by the compaction and can be coated with facing materials or simply painted for either an interior or exterior wall. A single thickness of the material can provide the entire wall structure, one side providing the interior wall and the other side the exterior wall.

The invention and its advantages will be more clearly understood and appreciated from the following detailed description with reference to the accompanying drawings.

DESCRIPTION OF THE PREFERRED EMBODIMENT

Figure 1:
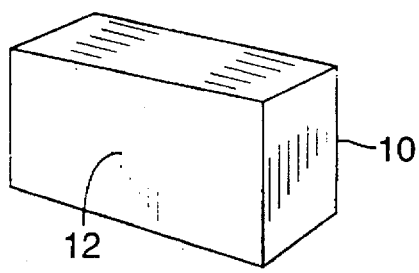
FIG. 1 is a view of a panel formed from the building material of the present invention.

FIG. 1 illustrates a panel 10 that is formed or fabricated by utilizing the building material 12 of the present invention. In this embodiment, the panel 10 is fabricated to have dimensions that are typical of a member that is utilized in the construction trade. The panel 10 may, for example, be produced to be 4' wide×8' long and have a thickness of 4 inches. It will be appreciated that the panel 10 may be produced to have other dimensions and may have configurations other than illustrated.

The material utilized to form the panel 10 is a mixture of expanded polystyrene beads, type III cement, acrylic latex bond and a quantity of water. The components of the mixture are mixed together in a suitable mixture such as by a cement mixer to produce a homogeneous mixture that may be poured or deposited into a suitable mold or frame. The material in the mold (frame) is then compressed prior to solidification as by a hydraulic press.

Figure 2:
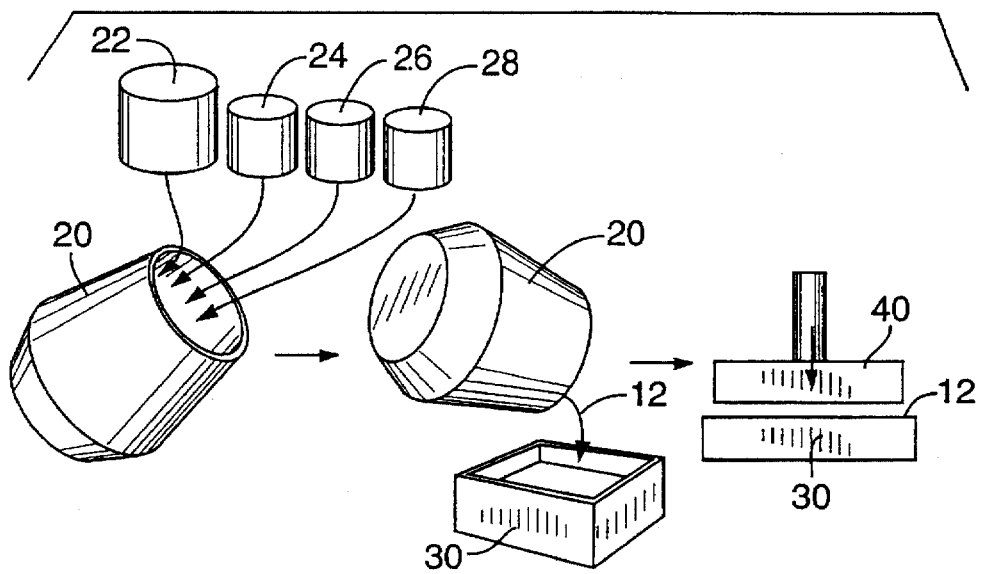
FIG. 2 illustrates in diagram for a method of forming the panel of FIG. 1.

FIG. 2 illustrates in diagram form one method of producing the panel 10 of FIG. 1. A known mixer 20 is utilized to uniformly mix the components that form the mixture 12. A quantity of expanded polystyrene beads 22 and type III cement 24 is uniformly mixed by the mixer 20 to provide a uniform distribution of the cement 24 throughout the polystyrene beads 22. An acrylic bond 26 and water 28 are added to the polystyrene beads 22 and the cement 24 that is in the mixer and the mixer is continued to operate until a homogenous mixture of the material 12 is obtained. The material 12 is then placed into a mold 30 that is configured to produce an end product such as the panel 10 of FIG. 1. The material 12 in the mold 30 is then compressed such as by a hydraulic press 40 and the material 12 is then allowed to solidify. The press 40 compresses the material 12 in the mold 30 to the desired thickness of the panel 10.

The panel 10 of FIG. 1 or a similar member produced by mixing the polystyrene beads, acrylic bond, type III cement and water together and then compressing prior to the curing (bonding) process produces a member that has a higher strength than it would have if it were not compressed. The compression cycle increases the density of the polystyrene beads in the panel 10. In addition the beads will conform to the surface finish of the mold (frame) and pressing ram of the press. The panel 10 may, for example, be produced with flat surfaces or may be produced with contours or shapes that conform to the contours or shapes provided on the mold and the ram of the press.

Figure 3:
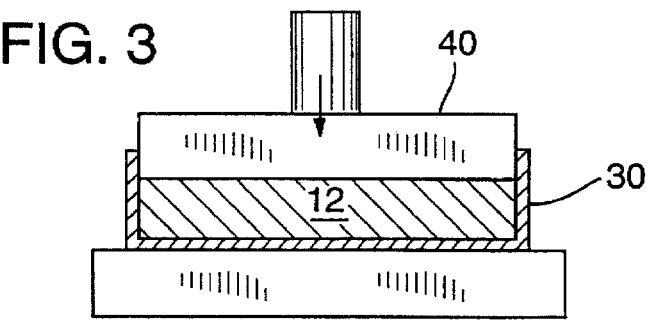
FIG. 3 is a sectional view illustrating the material of the present invention being compressed to form the panel of FIG. 1.

The insulating value of the panel or member that has been compressed to increase its density remains substantially the same as the insulating value of the material 12 that is free poured into a mold. Prior to compression, the polystyrene beads have an insulating R value of about 3.5 per inch of thickness of the beads. It has been found, for example, that to produce a 4"×4'×8' panel that will have an insulating value of about R21, the mold is filled with a sufficient volume to produce a 6"×4'×8' panel when it is loosely poured. A panel 6" in depth that is fabricated from the polystyrene beads has a R value of about R21. The 6"×4'×8' volume of polystyrene beads received in the mold is compressed down to a 4"×4'×8' volume as illustrated in FIG. 3 to produce the higher strength panel such as the panel 10 of FIG. 1. The R value of the compressed panel (4" thick) is substantially the same as the R value for the freely poured volume which would be 6" thick.

The mixture 12 in one embodiment of the invention which is utilized to form the panel 10 of FIG. 1 and other members is produced by mixing with each cubic foot of expanded polystyrene beads 3 lbs. of type III cement, 32 oz. of acrylic latex bond and 32 oz. of water. It will be appreciated that the amount of the type III cement, the acrylic latex bond and the water may be varied to produce an end product to suit the requirements. The pressure applied to compress the material 12 is varied to obtain the desired density and strength characteristics in the end product. Typically the pressure applied to compress the material is the range of about 30 pounds per square inch to about 300 pounds per square inch.

The resulting panel is a rigid insulating panel that is developed by utilizing compression. While compression has been used in manufacturing wood products such as particle board and plywood, it has not been known to be used in the manufacture of polystyrene products.

Figure 4:
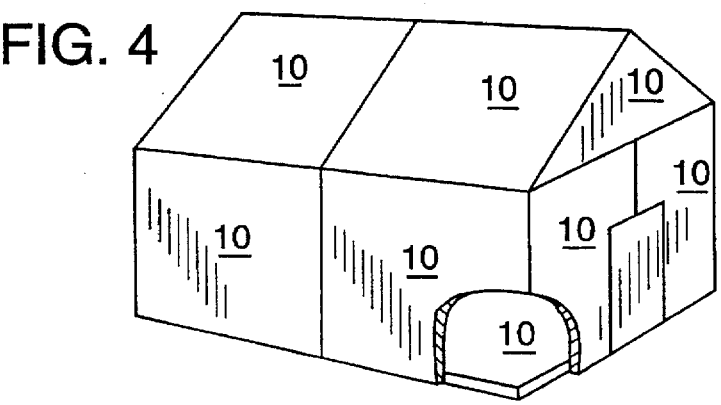
FIG. 4 illustrates a building structure produced from the panel of FIG. 1.

The rate of curing (bonding and solidification) is enhanced by the addition of heat during the pressing operation. This will reduce the time required for the solidification and bonding of the components of the mixture 12. Upon completion, the panel 10 is sufficiently light weight to be readily handled and to be assembled into a building structure as a floor, wall or ceiling as illustrated in FIG. 4.

Those skilled in the art will recognize that modifications and variations may be made without departing from the true spirit and scope of the invention. In a specific example, I produced a sheet which was 95% EPS polystyrene beads mixed with an acrylic latex bond and cement mixture. The sheet had the desired strength and R factor and was light weight as desired for construction. The invention is not to be limited to the embodiments described and illustrated but is to be determined from the appended claims.

I claim:

1. A method of producing a building material which comprises the steps of:

intermixing as a slurry a quantity of loose pre-expanded polystyrene beads with a curable adhesive compatible with the polystyrene beads, said adhesive provided in an amount sufficient to bond the beads together in the compressing step as hereafter described, the polystyrene beads substantially providing the only ingredient other than the adhesive as required to bond the beads together;

compressing the beads in a press and under a pressure of at least about 30 psi prior to curing of the adhesive; and holding the mixture in the compressed form until the adhesive sufficiently cures and thereby bonds the compressed beads together to form a rigid member substantially consisting only of the polystyrene beads and cured adhesive that is light weight and highly insulative.

2. A method of producing a building material as defined in claim 1, further including:

adding a quantity of cement as a portion of the adhesive, which cement also functions as a fire retardant.

3. A method of producing a building material as defined in claim 2, further including:

adding a quantity of water to the beads, adhesive and cement to achieve the desired slurry, during the intermixing step.

4. A method as defined in claim 3 wherein the slurry mixture includes about 3 lbs. of type III cement, about 32 oz. of acrylic latex bond and almost 32 oz. of water for each cubic foot of expanded polystyrene beads.

5. A method as defined in claim 1 wherein the pressure applied to compress the material is in the range of about 30 lbs. per square inch to about 300 lbs. per square inch.

6. A method as defined in claim 5 wherein the compressing step is provided in a press having opposed faces that compress the material and form the side walls, said side walls conforming to the surface of the opposed faces.

* * * * *